(12) United States Patent
Wang et al.

(10) Patent No.: US 11,807,542 B2
(45) Date of Patent: Nov. 7, 2023

(54) METHOD FOR PREPARING UREA AMMONIUM NITRATE SOLUTION FROM WASTE NITRIC ACID AFTER STRIPPING TIN FROM CIRCUIT BOARD

(71) Applicant: SHENZHEN ENVIRONMENTAL TECHNOLOGY GROUP CO. LTD., Shenzhen (CN)

(72) Inventors: Wei-Hong Wang, Shenzhen (CN); Jian-Gang Wu, Shenzhen (CN); Chao-Lin Mao, Shenzhen (CN); Chun-Hua Liao, Shenzhen (CN); Chang-Ming Chen, Shenzhen (CN); Kuan-Wei Huang, Shenzhen (CN); Xue-Qiang Huang, Shenzhen (CN)

(73) Assignee: SHENZHEN ENVIRONMENTAL TECHNOLOGY GROUP CO. LTD., Shenzhen (CN)

( * ) Notice: Subject to any disclaimer, the term of this patent is extended or adjusted under 35 U.S.C. 154(b) by 667 days.

(21) Appl. No.: 17/048,050

(22) PCT Filed: Jun. 6, 2019

(86) PCT No.: PCT/CN2019/090435
§ 371 (c)(1),
(2) Date: Oct. 15, 2020

(87) PCT Pub. No.: WO2019/233488
PCT Pub. Date: Dec. 12, 2019

(65) Prior Publication Data
US 2021/0163305 A1 Jun. 3, 2021

(30) Foreign Application Priority Data
Jun. 6, 2018 (CN) .......................... 201810575331.6

(51) Int. Cl.
| | | |
|---|---|---|
| *C01C 1/00* | (2006.01) |
| *C01C 1/18* | (2006.01) |
| *C02F 1/00* | (2023.01) |
| *C02F 1/04* | (2023.01) |
| *C02F 1/66* | (2023.01) |
| *C05C 1/00* | (2006.01) |
| *C05C 9/00* | (2006.01) |
| *C02F 101/16* | (2006.01) |
| *C02F 101/20* | (2006.01) |
| *C02F 101/22* | (2006.01) |
| *C02F 101/30* | (2006.01) |

(52) U.S. Cl.
CPC .............. *C01C 1/185* (2013.01); *C02F 1/001* (2013.01); *C02F 1/04* (2013.01); *C02F 1/66* (2013.01); *C05C 1/00* (2013.01); *C05C 9/00* (2013.01); *C02F 2101/163* (2013.01); *C02F 2101/203* (2013.01); *C02F 2101/22* (2013.01); *C02F 2101/30* (2013.01); *C02F 2301/08* (2013.01)

(58) Field of Classification Search
CPC .. C01C 1/185; C02F 1/001; C02F 1/04; C02F 1/66; C05C 1/00; C05C 9/00
USPC ......................................................... 423/396
See application file for complete search history.

(56) References Cited

FOREIGN PATENT DOCUMENTS

| | | |
|---|---|---|
| CN | 102775197 A | 11/2012 |
| CN | 108070720 A | 5/2018 |

*Primary Examiner* — Steven J Bos
(74) *Attorney, Agent, or Firm* — ScienBiziP, P.C.

(57) ABSTRACT

A method for preparing urea ammonium nitrate solution from waste nitric acid after stripping tin from circuit board includes: causing the waste nitric acid after stripping tin and the ammonia water to undergo neutralizing and precipitating reaction through acid-base neutralization, filtering, thereby obtaining tin-containing filter mud and a primary filtrate; adding iron powders into to the primary filtrate to initiate copper-iron replacement reaction, filtering, thereby obtaining iron-containing coarse copper powders and a secondary filtrate; adding hydrogen peroxide to the secondary filtrate, filtering, thereby obtaining an iron-containing sludge and a tertiary filtrate; adding a heavy metal capturing agent to the tertiary filtrate, filtering, thereby obtaining a heavy metal sludge and an ammonium nitrate solution; measuring a concentration of the ammonium nitrate solution, adding urea and liquid fertilizer corrosion inhibitor to obtain a urea/ammonium nitrate dilute solution, evaporating and concentrating the urea/ammonium nitrate dilute solution, thereby obtaining the urea ammonium nitrate solution.

10 Claims, 1 Drawing Sheet

```
                                                            ┌─S11
┌───────────────────────────────────────────────────────────────────────┐
│ Providing the waste nitric acid after stripping tin, causing the waste nitric acid after stripping │
│ tin and the ammonia water to undergo a neutralizing and precipitating reaction through acid- │
│ base neutralization, a pH value of the neutralizing and precipitating reaction being between 4 │
│ and 5, a temperature of the neutralizing and precipitating reaction being between 50 degrees │
│ Celsius and 90 degrees Celsius, filtering, thereby obtaining a tin-containing filter mud and a │
│ primary filtrate │
└───────────────────────────────────────────────────────────────────────┘
                                    │
                                    ▼                       ┌─S12
┌───────────────────────────────────────────────────────────────────────┐
│ Treating the primary filtrate by a copper-iron replacement method: adding iron powders into to the │
│ primary filtrate to initiate a copper-iron replacement reaction, the iron powders being reduced iron │
│ powders, thereby recovering a portion of copper ions in the primary filtrate to copper powders, filtering, │
│ thereby obtaining iron-containing coarse copper powders and a secondary filtrate │
└───────────────────────────────────────────────────────────────────────┘
                                    │
                                    ▼                       ┌─S13
┌───────────────────────────────────────────────────────────────────────┐
│ Treating the secondary filtrate by a Fenton method: adding a hydrogen peroxide to the secondary │
│ filtrate, which undergoes a redox reaction with ferrous ions and organic impurities in the secondary │
│ filtrate, and adjusting a pH value of the secondary filtrate to be between 5.5 and 6 by an ammonia water, │
│ filtering, thereby obtaining an iron-containing sludge and a tertiary filtrate │
└───────────────────────────────────────────────────────────────────────┘
                                    │
                                    ▼                       ┌─S14
┌───────────────────────────────────────────────────────────────────────┐
│ Treating the tertiary filtrate by a precipitation method using a heavy metal capturing agent: │
│ adding a heavy metal capturing agent to the tertiary filtrate, thereby causing remaining heavy │
│ metal ions in the tertiary filtrate to undergo a complex reaction to form heavy metal │
│ precipitates, the heavy metal ions comprising at least one of tin ions, mercury ions, cadmium │
│ ions, arsenic ions, lead ions, chromium ions, and nickel ions and further comprising another │
│ portion of copper ions, separating the heavy metal precipitates and filtering, thereby obtaining │
│ a heavy metal sludge and an ammonium nitrate solution │
└───────────────────────────────────────────────────────────────────────┘
                                    │
                                    ▼                       ┌─S15
┌───────────────────────────────────────────────────────────────────────┐
│ measuring a concentration of the ammonium nitrate solution, adding urea and liquid fertilizer │
│ corrosion inhibitor to obtain a urea/ammonium nitrate dilute solution, evaporating and │
│ concentrating the urea/ammonium nitrate dilute solution, the evaporating being at a │
│ temperature between 36 degrees Celsius and 100 degrees Celsius, and terminating the │
│ evaporating and the concentrating when a specific gravity of a concentrated liquid is between │
│ 1.28 and 1.32, thereby obtaining the urea ammonium nitrate solution, which comprises a total │
│ nitrogen content of 28% to 32% │
└───────────────────────────────────────────────────────────────────────┘
```

METHOD FOR PREPARING UREA AMMONIUM NITRATE SOLUTION FROM WASTE NITRIC ACID AFTER STRIPPING TIN FROM CIRCUIT BOARD

FIELD

The subject matter relates to a cross field of environmental protection and fertilizer production, and more particularly to a method for preparing urea ammonium nitrate solution, which is accordance with standard "Urea Ammonium Nitrate Solution" (NY2670-2015), from waste nitric acid after stripping tin from circuit board.

BACKGROUND

Although a large-scale application of liquid fertilizer starts late in China, the liquid fertilizer has rapidly developed in recent years due to advantages of low production cost, fast fertilizer efficiency, high fertilizer utilization rate, integration of water and fertilizer, and outstanding environmental benefits. Urea ammonium nitrate solution (UAN) is the most popular liquid fertilizer in China.

The UAN is made of urea, ammonium nitrate, and water, and is a colorless, stable, and non-explosive liquid fertilizer containing nitrogen. The fertilizer efficiency, energy saving, water saving, environmental protection, and economy of the UAN are superior to those of solid-state fertilizer. There are generally three grades of UAN on the international market, including UANs with respective nitrogen contents of 28%, 30/a, and 32%. From 2011 to 2013, the global UAN production was basically maintained at 20 to 21 million tons (including more than 11 million tons in North America), which accounts for about 4% of total nitrogen fertilizer production. The UAN is mainly used in Europe and the United States, and has been fully promoted and used in water-deficient countries. In the United States, the liquid fertilizer accounts for about 60%, half of which is UAN. In Israel, the liquid fertilizer accounts for 100%, and most of the liquid fertilizers are UAN or high-efficiency liquid compound fertilizer processed by UAN. China had very little UAN produced before 2012, but in 2013, the Ministry of Agriculture listed the UAN in the fertilizer registration list, and the agricultural industry standard "Urea Ammonium Nitrate Solution" (NY2670-2015) was released in 2015. In 2016, the production of the UAN has reached 327,000 tons, and the promotion area has also gradually expanded.

Printed circuit boards (PCBs) are basic components of the modern electronics and information industries. Tin stripping is one of the processes in PCB manufacturing. The waste from tin-stripping process is nitric acid as a waste solution, which is generated by the tin-stripping agents selectively dissolving the tin or tin-copper alloy on the PCB copper layer without etching the copper substrate. The commonly used tin-stripping agents are nitric acid type. The waste nitric acid after stripping tin is a dark green irritatant solution, which includes 20%~40% nitric acid, 50~150 g/L tin, and 1~20 g/L copper, and 5~20 g/L of iron.

The waste nitric acid after stripping tin is mainly processed by regeneration and recycle method, by acid-base neutralization method, and by a combination thereof. The regeneration and recycle method is suitable for the recycling of waste liquid at the source of the production line of an enterprise. The regeneration and recycle method should be in line with the concept of circular economy, but is not widely applied due to the non-constant quality of the tin-stripping agent. The acid-base neutralization method is mostly applied in business units that receive and treat the waste nitric acid after stripping tin. The acid-base neutralization method neutralizes the free nitric acid in the waste solution mainly by sodium hydroxide, lime, or ammonia water. Metal ions such as tin, copper and iron are precipitated, and mud cakes mainly composed of tin oxyhydroxide are obtained by pressure filtration. The mud cakes can be passed to the downstream tin-smelting manufacturers, but the destination of the remaining sodium nitrate, calcium nitrate, or ammonium nitrate solution is unknown.

In addition, conventional method methods for preparing a fertilizer-grade ammonium nitrate concentrated solution by a mother solution of the waste tin-stripping solution after the tin is precipitated, which provides a simple and cheap resource utilization concept for the ammonium nitrate solution generated from the waste nitric acid after stripping tin by the acid-base neutralization method. However, the ammonium nitrate concentrated solution is a non-standard product, as the low nitrogen content, narrow sale range, and the willingness of the compound fertilizer manufacturer to use the ammonium nitrate concentrated solution promotes reluctance. Also, the ammonium nitrate concentrated solution can be easily converted to solid ammonium nitrate by further evaporation and concentration. The solid ammonium nitrate is listed in the National Explosives List as a Civil Explosive, and be strictly limited in production and use. Based on the above two points, large-scale promotion and application of the ammonium nitrate concentrated solution is unlikely.

SUMMARY

The present disclosure provides a method for preparing urea ammonium nitrate solution from waste nitric acid after stripping tin from circuit board. The method includes:

mixing the waste nitric acid after stripping tin with ammonia water, causing the waste nitric acid after stripping tin and the ammonia water to undergo a neutralizing and precipitating reaction through acid-base neutralization, a pH value of the neutralizing and precipitating reaction being between 4 and 5, a temperature of the neutralizing and precipitating reaction being between 50 degrees Celsius and 90 degrees Celsius, filtering a reaction solution of the waste nitric acid after stripping tin and the ammonia water, thereby obtaining a tin-containing filter mud and a primary filtrate;

adding iron powders into to the primary filtrate to initiate a copper-iron replacement reaction, the iron powders being reduced iron powders, thereby recovering a portion of copper ions in the primary filtrate to copper powders, filtering the primary filtrate, thereby obtaining iron-containing coarse copper powders and a secondary filtrate;

adding hydrogen peroxide to the secondary filtrate, which undergoes a redox reaction with ferrous ions and organic impurities in the secondary filtrate, and adjusting a pH value of the secondary filtrate to be between 5.5 and 6 by ammonia water, filtering the secondary filtrate, thereby obtaining an iron-containing sludge and a tertiary filtrate;

adding a heavy metal capturing agent to the tertiary filtrate, thereby causing remaining heavy metal ions in the tertiary filtrate to undergo a complex reaction to form heavy metal precipitates, the heavy metal ions comprising at least one of tin ions, mercury ions, cadmium ions, arsenic ions, lead ions, chromium ions, and nickel ions and further comprising another portion of copper ions, separating the heavy metal precipitates and filtering the tertiary filtrate, thereby obtaining a heavy metal sludge and an ammonium nitrate solution;

measuring a concentration of the ammonium nitrate solution, adding urea and liquid fertilizer corrosion inhibitor to the ammonium nitrate solution to obtain a urea/ammonium nitrate dilute solution, evaporating and concentrating the urea/ammonium nitrate dilute solution, the evaporating being at a temperature between 36 degrees Celsius and 100 degrees Celsius, and terminating the evaporating and the concentrating when a specific gravity of a concentrated liquid is between 1.28 and 1.32, thereby obtaining the urea ammonium nitrate solution, which comprises a total nitrogen content of 28% to 32%.

Complete utilization of tin, copper, and nitrate nitrogen in the waste nitric acid after stripping tin is realized according to the disclosure. The process is safe and efficient, and the obtained urea ammonium nitrate liquid fertilizer meets the agricultural industry standard "Urea Ammonium Nitrate Solution" (NY2670-2015). The content of the total nitrogen (N) is greater than or equal to 28.0%. The content of the amide nitrogen (N) is greater than or equal to 14.0%. The content of the nitrate nitrogen (N) is greater than or equal to 7.0%. The content of the ammonium nitrogen (N) is greater than or equal to 7.0%. The content of the biuret is less than or equal to 0.5%. The content of the water insoluble residue is less than or equal to 0.5%. The pH value is between 5.5 and 7.0. The content of the mercury (Hg) content is less than or equal to 5 mg/Kg. The content of the arsenic (As) is less than or equal to 5 mg/Kg. The content of the cadmium (Cd) is less than or equal to 5 mg/Kg. The content of the chromium (Cr) is less than or equal to 25 mg/Kg. The content of the lead (Pb) is less than or equal to 25 mg/Kg.

BRIEF DESCRIPTION OF THE DRAWING

FIG. 1 is a flowchart of an embodiment of a method for preparing urea ammonium nitrate solution from waste nitric acid after stripping tin from circuit board circuit board according to the present disclosure.

DETAILED DESCRIPTION

FIG. 1 illustrates an embodiment of a method for preparing a urea ammonium nitrate solution from waste nitric acid after stripping tin from circuit board circuit board according to the present disclosure.

The method for preparing urea ammonium nitrate solution from waste nitric acid after stripping tin from circuit board circuit board includes following steps.

S11, the waste nitric acid, after tin-stripping, is provided. The waste nitric acid after stripping tin and ammonia water undergo a neutralizing and precipitating reaction through acid-base neutralization. A pH value of the neutralizing and precipitating reaction is between 4 and 5. A temperature of the neutralizing and precipitating reaction is between 50 degrees Celsius and 90 degrees Celsius. The reaction solution is filtered, thereby obtaining a tin-containing filter mud and a primary filtrate.

In one embodiment, an ammonium nitrate solution is added into a reactor as a base solution, which has a temperature between 50 degrees Celsius and 90 degrees Celsius and a concentration between 0 and 70%. A probe of a pH meter can be immersed in the added base solution. Then, the ammonia water having a concentration of 20% to 50% and the waste nitric acid after stripping tin are added. A flow rate of the waste acid solution after stripping tin and the ammonia water is adjusted so as to maintain the pH value of the neutralizing and precipitating reaction to be between 4 and 5 and the temperature to be between 50 degrees Celsius and 90 degrees Celsius. Then, the waste nitric acid after stripping tin and the ammonia water are added until a preset volume is reached. The reaction solution is filtered, thereby obtaining the tin-containing filter mud and the primary filtrate.

S12, the primary filtrate is treated by a copper-iron replacement method. That is, iron powders are added into to the primary filtrate to initiate a copper-iron replacement reaction. The iron powders are reduced iron powders, thereby recovering most of the copper ions in the primary filtrate to copper powders. The primary filtrate is filtered, thereby obtaining iron-containing coarse copper powders and a secondary filtrate.

In one embodiment, a content of copper of the primary filtrate is measured. The added reduced iron powders bring the iron and copper into a ratio of 1.1 to 1.2 by weight. The primary filtrate is filtered to obtain the iron-containing coarse copper powders and the secondary filtrate. A content of copper in the secondary filtrate is less than 100 mg/L.

S13, the secondary filtrate is treated by a Fenton method. That is, hydrogen peroxide is added to the secondary filtrate, which undergoes a redox reaction with ferrous ions and organic impurities in the secondary filtrate. A pH value of the secondary filtrate is adjusted to be between 5.5 and 6 by ammonia water. The secondary filtrate is filtered, thereby obtaining an iron-containing sludge and a tertiary filtrate.

In one embodiment, a pH value of the secondary filtrate is adjusted to be between 3 and 4 by nitric acid having a concentration of 40% to 68%. After adjusting the pH of the secondary filtrate, the hydrogen peroxide having a concentration of 27.5% to 35% is added to the secondary filtrate, which brings the reduced iron powders and the hydrogen peroxide into a ratio of 1:2~3:1 by weight. The pH value of the secondary filtrate is adjusted to be between 5.5 and 6.0 by the ammonia water having a concentration of 20% to 25%. The secondary filtrate is filtered, thereby obtaining the iron-containing sludge and the tertiary filtrate.

S14, the tertiary filtrate is treated by a precipitation method using a heavy metal capturing agent. That is, the heavy metal capturing agent is added to the tertiary filtrate, thereby causing the remaining heavy metal ions in the tertiary filtrate to undergo a complex reaction to form heavy metal precipitates. The heavy metal ions include at least one of tin ions, mercury ions, cadmium ions, arsenic ions, lead ions, chromium ions, and nickel ions, and further include another portion of copper ions. The heavy metal precipitates are separated and the tertiary filtrate is filtered, thereby obtaining a heavy metal sludge and an ammonium nitrate solution.

In one embodiment, the heavy metal capturing agent is tripolythiocyanate or dithiocarbamate.

In one embodiment, when the heavy metal capturing agent is tripolythiocyanate, the added tripolythiocyanate is in an amount of 0.1% by weight in the tertiary filtrate, which can decrease the heavy metal ions in the tertiary filtrate to a content between 0 and 2 mg/L. The tertiary filtrate is filtered, thereby obtaining the heavy metal sludge and the ammonium nitrate solution.

In another embodiment, when the heavy metal capturing agent is dithiocarbamate, the added dithiocarbamate is in an amount of 0.1% by weight in the tertiary filtrate, which can decrease the heavy metal ions in the tertiary filtrate to a content between 0 and 2 mg/L. The tertiary filtrate is filtered, thereby obtaining the heavy metal sludge and the ammonium nitrate solution.

S15, the concentration of the ammonium nitrate solution is measured. Urea and liquid fertilizer corrosion inhibitor are added to obtain a urea/ammonium nitrate dilute solution. The urea/ammonium nitrate dilute solution is evaporated and concentrated. The evaporation is at a temperature between 36 degrees Celsius and 100 degrees Celsius. The evaporation and concentration are terminated when a specific gravity of the concentrated liquid is between 1.28 and 1.32, thereby obtaining the urea ammonium nitrate solution, which includes a total nitrogen content of 28% to 32%.

In one embodiment, the liquid fertilizer corrosion inhibitor is ammonium dihydrogen phosphate.

In one embodiment, the concentration of the ammonium nitrate solution is measured so as to calculate an amount of the urea and the ammonium dihydrogen phosphate required to obtain the urea ammonium nitrate solution, which includes a total nitrogen content of 28% to 32%. The urea and the ammonium dihydrogen phosphate are added and dissolved in the ammonium nitrate solution to obtain the urea/ammonium nitrate dilute solution. Then, the urea/ammonium nitrate dilute solution is evaporated and concentrated at a medium and low temperature between 36 degrees Celsius and 100 degrees Celsius. When the specific gravity of the concentrated liquid reaches 1.28 to 1.32, the evaporation is terminated, and the concentrated liquid is cooled to room temperature to obtain the urea ammonium nitrate solution, which includes a total nitrogen content of 28% to 32%.

Implementations of the present disclosure will now be described by way of specific example.

Example 1

At step one, a 2 L beaker was first placed in a water bath having a constant temperature of 50 degrees Celsius. 100 mL of clean water was added into the beaker, and a pH meter was inserted to below the liquid level. Then, 1 L of waste nitric acid A after stripping tin and 1 L of ammonia water having a concentration of 20% were provided by a 1 L measuring cylinder. The cylinders containing waste nitric acid A after stripping tin and the ammonia water were connected to the beaker through two peristaltic pumps and hoses. Then, the clean water was stirred, the peristaltic pump was then turned on. The waste nitric acid A after stripping tin and the ammonia water were simultaneously injected into the clean water to initialize a neutralizing and precipitating reaction. The flow rate of the waste nitric acid A after stripping tin was kept at 25 mL/min, and then the flow rate of the ammonia water was adjusted to ensure that the pH of the reaction solution was between 4.0 to 4.5. After adding 1 L of the waste nitric acid A after stripping tin, the ammonia water was added until the consumption of the ammonia water was 439 mL at this time. Then, the reaction solution was suction filtered, finally obtaining 1042 mL of a primary filtrate of and 607 g of a tin hydroxide filter mud. The content of copper in the filtrate was 2.2 g/L.

At step two, the primary filtrate was poured into a 2 L beaker. 2.8 g of reduced iron powders were added when the primary filtrate was stirred. The reaction product was suction filtered after the reaction lasted for 10 minutes, finally obtaining 1030 mL of a secondary filtrate and 3.2 g of iron-containing coarse copper powders. The content of copper in the secondary filtrate was 65 mg/L.

At step three, 1.25 mL of nitric acid having a concentration of 40% was added to the secondary filtrate, to adjust the pH of the secondary filtrate to be 3.5. Then, 13 mL of a hydrogen peroxide having a concentration of 30% was added. After the reaction lasted for 10 minutes, 9.5 mL of an ammonia water having a concentration of 20% was added to adjust the pH value of the secondary filtrate to be 5.5. The secondary filtrate was suction filtered, thereby obtaining 1039 mL of a tertiary filtrate including a small amount of heavy metal and 31 g of a ferric hydroxide sludge.

At step four, the total tertiary filtrate was poured into a 2 L beaker. 11.3 g of a sodium tripolythiocyanate solution having a concentration of 10% was added when the tertiary filtrate was stirred. After the reaction lasted for 5 minutes, the reaction solution was suction filtered, finally obtaining 1084 g of the ammonium nitrate solution A and 2.5 g of the trithiocyanuric acid-heavy metal precipitates.

The main components of the ammonium nitrate solution A and their contents are shown in Table 1. After calculation, 1084 g of the ammonium nitrate solution A (containing ammonium nitrate 206 g) can be used to prepared a UAN solution having a content of 28% (a mass of about 500 g, a volume of about 390 mL, and a specific gravity of 1.28). Considering the impact of thermal expansion and cold shrinkage, tap water of 400 mL was added into a 2 L evaporation bottle of a rotary evaporator. The evaporation bottle was fixed, and a tick mark was labeled. The tap water in the evaporation bottle was poured away, and 1084 g of the ammonium nitrate solution A, 155 g of urea, and 1.0 g of ammonium dihydrogen phosphate were added. The evaporation bottle was fixed, and the mixture was evaporated at 90 degrees Celsius. When the volume of the solution reached the tick mark, the evaporation was terminated, and the concentrated liquid was cooled to room temperature to obtain 495 g of the UAN solution (having a concentration of 28%, the main components of the ammonium nitrate solution A and their contents are shown in Table 1).

TABLE 1

Main components of the ammonium nitrate solution prepared by the waste nitric acid A after stripping tin and their contents, and main components of the UAN solution having a concentration of 28%

| Items | Total nitrogen | Amide nitrogen | Nitrate nitrogen | Ammonium nitrogen | Biuret | Water insoluble residue | pH(diluted with a ratio of 1:250) |
|---|---|---|---|---|---|---|---|
| Ammonium nitrate solution, % | 6.43 | 0 | 3.27 | 3.26 | 0 | 0.02 | 5.6 |
| UAN solution, % | 28.5 | 14.3 | 7.25 | 7.23 | 0.15 | 0.04 | 5.7 |
| «NY2067-2015», % | ≥28.0 | ≥14.0 | ≥7.0 | ≥7.0 | ≤0.5 | ≤0.5 | 5.5~7.0 |
| Items | Hg | As | Cd | Pb | Cr | Cu | Sn |

TABLE 1-continued

Main components of the ammonium nitrate solution prepared by the waste nitric acid A after stripping tin and their contents, and main components of the UAN solution having a concentration of 28%

| Items | Total nitrogen | Amide nitrogen | Nitrate nitrogen | Ammonium nitrogen | Biuret | Water insoluble residue | pH(diluted with a ratio of 1:250) |
|---|---|---|---|---|---|---|---|
| Ammonium nitrate solution, mg/kg | <2 | <1 | <0.04 | <2 | <0.2 | 0.5 | <0.5 |
| UAN solution, mg/kg | <2 | <1 | <0.04 | <2 | <0.2 | 1.1 | <0.5 |
| «NY2067-2015», mg/kg | ≤5 | ≤5 | ≤5 | ≤25 | ≤25 | — | — |

Example 2

At step one, a 2 L flask with three necks was first placed in a water bath having a constant temperature of 90 degrees Celsius. 100 mL of ammonium nitrate solution having a concentration of 20% was added into the flask with three necks, and a pH meter was inserted to below the liquid level. Then, 1 L of waste nitric acid B after stripping tin and 1 L of ammonia water having a concentration of 25% were provided by a 1 L measuring cylinder. The cylinders containing the waste nitric acid B after stripping tin and the ammonia water were connected to the flask with three necks through two peristaltic pumps and hoses. Then, the ammonium nitrate solution was stirred, the peristaltic pump was then turned on. The waste nitric acid B after stripping tin and the ammonia water were simultaneously injected into the ammonium nitrate solution to initialize a neutralizing and precipitating reaction. The flow rate of the waste nitric acid B after stripping tin was kept at 20 mL/min, and then the flow rate of the ammonia water was adjusted to ensure that the pH of the reaction solution was between 4.5 to 5.0. After adding 1 L of the waste nitric acid B after stripping tin, the ammonia water was added until the consumption of the ammonia water was 467 mL. Then, the reaction solution was suction filtered, finally obtaining 1058 mL of a primary filtrate and 645 g of a tin hydroxide filter mud. The content of copper in the filtrate was 13.6 g/L.

At step two, the primary filtrate was poured into a 2 L beaker. 17.5 g of reduced iron powders were added when the primary filtrate was stirred. The reaction product was suction filtered after the reaction lasted for 10 minutes, finally obtaining 1044 mL of a secondary filtrate and 16.7 g of iron-containing coarse copper powders. The content of copper in the secondary filtrate was 80 mg/L.

At step three, 8 mL of nitric acid having a concentration of 50% was added to the secondary filtrate, to adjust the pH of the secondary filtrate to be 3.2. Then, 70 mL of hydrogen peroxide having a concentration of 27.5% was added. After the reaction lasted for 10 minutes, 47 mL of ammonia water having a concentration of 25% was added to adjust the pH value of the secondary filtrate to be 5.5. The secondary filtrate was suction filtered, thereby obtaining 1092 mL of a tertiary filtrate including a small amount of heavy metal and 112 g of a ferric hydroxide sludge.

At step four, the total tertiary filtrate was poured into a 2 L beaker. 10.9 g of sodium dithiocarbamate solution having a concentration of 10% was added as the tertiary filtrate was stirred. After the reaction lasted for 5 minutes, the reaction solution was suction filtered, finally obtaining 1176 g of ammonium nitrate solution B and 2.8 g of dithiocarbamate acid-heavy metal precipitates.

The main components of the ammonium nitrate solution B and their contents are shown in Table 2. After calculation, 1176 g of the ammonium nitrate solution B (containing ammonium nitrate 309 g) can be used to prepared a UAN solution having a content of 30% (a mass of about 700 g, a volume of about 538 mL, and a specific gravity of 1.30). Considering the impact of thermal expansion and cold shrinkage, 560 mL of tap water was added into a 2 L evaporation bottle of a rotary evaporator. The evaporation bottle was fixed, and a tick mark was labeled. The tap water in the evaporation bottle was poured away, and 1084 g of the ammonium nitrate solution B, 234 g of urea, and 1.4 g of ammonium dihydrogen phosphate were added. The evaporation bottle was fixed, and the mixture was evaporated at 100 degrees Celsius. When the volume of the solution reached the tick mark, the evaporation was terminated, and the concentrated liquid was cooled to room temperature to obtain 702 g of the UAN solution (having a concentration of 30%, the main components of the ammonium nitrate solution B and their contents are shown in Table 2).

TABLE 2

Main components of the ammonium nitrate solution prepared by the waste nitric acid B after stripping tin and their contents, and main components of the UAN solution having a concentration of 30%

| Items | Total nitrogen | Amide nitrogen | Nitrate nitrogen | Ammonium nitrogen | Biuret | Water insoluble residue | pH(diluted with a ratio of 1:250) |
|---|---|---|---|---|---|---|---|
| Ammonium nitrate solution, % | 9.19 | 0 | 4.60 | 4.59 | 0 | 0.02 | 5.6 |
| UAN solution, % | 30.6 | 15.2 | 7.70 | 7.69 | 0.18 | 0.05 | 5.8 |
| «NY2067-2015», % | ≥28.0 | ≥14.0 | ≥7.0 | ≥7.0 | ≤0.5 | ≤0.5 | 5.5~7.0 |
| Items | Hg | As | Cd | Pb | Cr | Cu | Sn |
| Ammonium nitrate solution, mg/kg | <2 | <1 | <0.04 | <2 | <0.2 | 0.8 | <0.5 |

TABLE 2-continued

Main components of the ammonium nitrate solution prepared by the waste nitric acid B after stripping tin and their contents, and main components of the UAN solution having a concentration of 30%

| Items | Total nitrogen | Amide nitrogen | Nitrate nitrogen | Ammonium nitrogen | Biuret | Water insoluble residue | pH(diluted with a ratio of 1:250) |
|---|---|---|---|---|---|---|---|
| UAN solution, mg/kg | <2 | <1 | <0.04 | <2 | <0.2 | 1.4 | <0.5 |
| «NY2067-2015», mg/kg | ≤5 | ≤5 | ≤5 | ≤25 | ≤25 | — | — |

Example 3

At step one, 1 $m^3$ of tap water having a temperature of 70 degrees Celsius was first placed in a 5 $m^3$ reaction kettle I. An industrial pH meter and an impeller were opened. Then, the feed paddles for waste nitric acid C after stripping tin and ammonia water were opened, to cause the waste nitric acid C after stripping tin and the ammonia water having a concentration of 25% to be simultaneously injected into the reaction kettle I to initialize a neutralizing and precipitating reaction. The flow rate of the waste nitric acid C after stripping tin was kept at 1 $m^3$/h, and then the flow rate of the ammonia water was adjusted to ensure that the pH of the reaction solution was between 4.5 to 5.0. After adding 2 $m^3$ of the waste nitric acid C after stripping tin, the feed paddles for the waste nitric acid after stripping tin and the ammonia water were shut when 1.03 $m^3$ of the ammonia water was consumed. Then, the reaction solution was pressure filtered, finally obtaining 3770 kg and 3.7 $m^3$ of a primary filtrate and 680 kg of a tin hydroxide filter mud. The content of copper in the filtrate was 3.7 g/L.

At step two, the primary filtrate was poured into a 5 $m^3$ reaction kettle II. The reaction kettle II was subjected to stirring, and 16.5 kg of reduced iron powders were added. The reaction product was pressed filtered after the reaction lasted for 10 minutes, finally obtaining 3.65 $m^3$ of a secondary filtrate and 17.9 kg of iron-containing coarse copper powders. The content of copper in the secondary filtrate was 80 mg/L.

At step three, 7.4 mL of nitric acid having a concentration of 68% was added to the secondary filtrate, to adjust the pH of the secondary filtrate to be 3.5. Then, 64.5 L of hydrogen peroxide having a concentration of 35% was added. After the reaction lasted for 10 minutes, 48 L of ammonia water having a concentration of 20% was added to adjust the pH value of the secondary filtrate to be 5.5. The secondary filtrate was pressed filtered, thereby obtaining 3.6 $m^3$ of a tertiary filtrate including a small amount of heavy metal and 66 kg of a ferric hydroxide sludge.

At step four, the total tertiary filtrate was poured into a 5 $m^3$ reaction kettle III having a volume. 3.6 L of a sodium dithiocarbamate solution having a concentration of 10% was added as the tertiary filtrate was stirred. After the reaction lasted for 5 minutes, the reaction solution was pressed filtered, finally obtaining 3.6 $m^3$ of the ammonium nitrate solution C and 1 kg of the dithiocarbamate acid acid-heavy metal precipitates.

The main components of the ammonium nitrate solution C and their contents are shown in Table 3. 80 kg of the ammonium nitrate solution C (containing ammonium nitrate 14.1 kg) was weighed, and 10.75 kg of urea and 64 g of ammonium dihydrogen phosphate were added and stirred to obtain a urea/ammonium nitrate dilute solution. A vacuum distillation device with a nominal evaporation capacity of 15 kg/h was used to perform evaporation and concentration at a temperature between 37 degrees Celsius and 38 degrees Celsius. When the volume of the water during evaporation and concentration reached 60 L, the evaporation was terminated. The concentrated liquid was discharged from the device, and was cooled to room temperature to obtain 30.2 kg of the UAN solution (having a concentration of 32%, the main components of the ammonium nitrate solution C and their contents are shown in Table 3).

TABLE 3

Main components of the ammonium nitrate solution prepared by the waste nitric acid C after stripping tin and their contents, and main components of the UAN solution having a concentration of 32%

| Items | Total nitrogen | Amide nitrogen | Nitrate nitrogen | Ammonium nitrogen | Biuret | Water insoluble residue | pH(diluted with a ratio of 1:250) |
|---|---|---|---|---|---|---|---|
| Ammonium nitrate solution, % | 6.18 | 0 | 3.09 | 3.09 | 0 | 0.02 | 5.7 |
| UAN solution, % | 32.7 | 16.3 | 8.20 | 8.19 | 0.08 | 0.05 | 5.9 |
| «NY2067-2015», % | ≥28.0 | ≥14.0 | ≥7.0 | ≥7.0 | ≤0.5 | ≤0.5 | 5.5~7.0 |
| Items | Hg | As | Cd | Pb | Cr | Cu | Sn |
| Ammonium nitrate solution, mg/kg | <2 | <0.2 | <0.05 | <0.2 | <0.02 | 1.2 | <0.5 |
| UAN solution, mg/kg | <2 | <1 | <0.4 | <20 | <2 | 3.2 | <0.5 |
| «NY2067-2015», mg/kg | ≤5 | ≤5 | ≤5 | ≤25 | ≤25 | — | — |

Complete utilization of tin, copper, and nitrate nitrogen in the waste nitric acid after stripping tin is realized according to the disclosure. The process is safe and efficient, and the obtained urea ammonium nitrate liquid fertilizer meets the agricultural industry standard "Urea Ammonium Nitrate Solution" (NY2670-2015). The content of the total nitrogen (N) is greater than or equal to 28.0%. The content of the amide nitrogen (N) is greater than or equal to 14.0%. The content of the nitrate nitrogen (N) is greater than or equal to 7.0%. The content of the ammonium nitrogen (N) is greater than or equal to 7.0%. The content of the biuret is less than or equal to 0.5%. The content of the water insoluble residue is less than or equal to 0.5%. The pH value is between 5.5 and 7.0. The content of the mercury (Hg) content is less than or equal to 5 mg/Kg. The content of the arsenic (As) is less than or equal to 5 mg/Kg. The content of the cadmium (Cd) is less than or equal to 5 mg/Kg. The content of the chromium (Cr) is less than or equal to 25 mg/Kg. The content of the lead (Pb) is less than or equal to 25 mg/Kg.

It is to be understood, even though information and advantages of one embodiments have been set forth in the foregoing description, together with details of the structures and functions of one embodiments, the disclosure is illustrative only; changes may be made in detail, especially in matters of shape, size, and arrangement of parts within the principles of one embodiments to the full extent indicated by the plain meaning of the terms in which the appended single claim is expressed.

What is claimed is:

1. A method for preparing urea ammonium nitrate solution from waste nitric acid after stripping tin from circuit board, the method comprising:
    mixing the waste nitric acid after stripping tin with ammonia water, causing the waste nitric acid after stripping tin and the ammonia water to undergo a neutralizing and precipitating reaction through acid-base neutralization, a pH value of the neutralizing and precipitating reaction being between 4 and 5, a temperature of the neutralizing and precipitating reaction being between 50 degrees Celsius and 90 degrees Celsius, filtering a reaction solution of the waste nitric acid after stripping tin and the ammonia water, thereby obtaining a tin-containing filter mud and a primary filtrate;
    adding iron powders into to the primary filtrate to initiate a copper-iron replacement reaction, the iron powders being reduced iron powders, thereby recovering a portion of copper ions in the primary filtrate to copper powders, filtering the primary filtrate, thereby obtaining iron-containing coarse copper powders and a secondary filtrate;
    adding hydrogen peroxide to the secondary filtrate, which undergoes a redox reaction with ferrous ions and organic impurities in the secondary filtrate, and adjusting a pH value of the secondary filtrate to be between 5.5 and 6 by ammonia water, filtering the secondary filtrate, thereby obtaining an iron-containing sludge and a tertiary filtrate;
    adding a heavy metal capturing agent to the tertiary filtrate, thereby causing remaining heavy metal ions in the tertiary filtrate to undergo a complex reaction to form heavy metal precipitates, the heavy metal ions comprising at least one of tin ions, mercury ions, cadmium ions, arsenic ions, lead ions, chromium ions, and nickel ions and further comprising another portion of copper ions, separating the heavy metal precipitates and filtering the tertiary filtrate, thereby obtaining a heavy metal sludge and an ammonium nitrate solution;
    measuring a concentration of the ammonium nitrate solution, adding urea and liquid fertilizer corrosion inhibitor to the ammonium nitrate solution to obtain a urea/ammonium nitrate dilute solution, evaporating and concentrating the urea/ammonium nitrate dilute solution, the evaporating being at a temperature between 36 degrees Celsius and 100 degrees Celsius, and terminating the evaporating and the concentrating when a specific gravity of a concentrated liquid is between 1.28 and 1.32, thereby obtaining the urea ammonium nitrate solution, which comprises a total nitrogen content of 28% to 32%.

2. The method of claim 1, wherein the heavy metal capturing agent is tripolythiocyanate or dithiocarbamate.

3. The method of claim 2, wherein when the heavy metal capturing agent is tripolythiocyanate, the tripolythiocyanate added is in an amount of 0.1% by weight in the tertiary filtrate, which decreases the heavy metal ions in the tertiary filtrate to a content between 0 and 2 mg/L.

4. The method of claim 2, wherein when the heavy metal capturing agent is dithiocarbamate, the dithiocarbamate added is in an amount of 0.1% by weight in the tertiary filtrate, which decreases the heavy metal ions in the tertiary filtrate to a content between 0 and 2 mg/L.

5. The method of claim 2, wherein the liquid fertilizer corrosion inhibitor is ammonium dihydrogen phosphate.

6. The method of claim 1, wherein the mixing of the waste nitric acid after stripping tin with ammonia water comprises:
    adding an ammonium nitrate solution into a reactor as a base solution, which has a temperature between 50 degrees Celsius and 90 degrees Celsius and a concentration between 0 and 70%;
    adding the ammonia water having a concentration of 20% to 50% and the waste nitric acid after stripping tin;
    adjusting a flow rate of the waste nitric acid after stripping tin and the ammonia water so as to maintain the pH value of the neutralizing and precipitating reaction to be between 4 and 5 and the temperature of the neutralizing and precipitating reaction to be between 50 degrees Celsius and 90 degrees Celsius, wherein the waste nitric acid after stripping tin and the ammonia water are added until a preset volume is reached.

7. The method of claim 1, wherein before the adding of the iron powders into to the primary filtrate, the method further comprises:
    measuring a content of copper of the primary filtrate;
    wherein the added reduced iron powders bring the iron and copper into a ratio of 1.1 to 1.2 by weight, and a content of copper in the secondary filtrate is less than 100 mg/L.

8. The method of claim 1, wherein before the adding of the hydrogen peroxide to the secondary filtrate, the method further comprises:
    adjusting a pH value of the secondary filtrate to be between 3 and 4 by a nitric acid having a concentration of 40% to 68%;
    wherein after the adjusting of the pH of the secondary filtrate, the hydrogen peroxide having a concentration of 27.5% to 35% is added to the secondary filtrate, which brings the reduced iron powders and the hydrogen peroxide into a ratio of 1:2~3:1 by weight, the pH value of the secondary filtrate is adjusted to be between 5.5 and 6.0 by the ammonia water having a concentration of 20% to 25%.

9. The method of claim 5, wherein the concentration of the ammonium nitrate solution is measured so as to calculate an amount of the urea and the ammonium dihydrogen phosphate required to obtain the urea ammonium nitrate solution, the urea and the ammonium dihydrogen phosphate are added and dissolved in the ammonium nitrate solution to obtain the urea/ammonium nitrate dilute solution.

10. The method of claim 6, further comprising:
immersing a probe of the pH meter in the added base solution.

* * * * *